United States Patent [19]
Coffey et al.

[11] 4,082,818
[45] Apr. 4, 1978

[54] MERCAPTAN ACTIVATION BY ACID IN THE COPOLYMERIZATION OF ACRYLONITRILE

[75] Inventors: Gerald P. Coffey, Cleveland Heights; Herbert F. Mazeke, Warrensville Heights, both of Ohio

[73] Assignee: The Standard Oil Company, Cleveland, Ohio

[21] Appl. No.: 687,151

[22] Filed: May 17, 1976

[51] Int. Cl.² ............... C08L 51/04; C08F 4/00; C08F 220/44
[52] U.S. Cl. ............... 260/879; 260/880 R; 526/193; 526/211; 526/214; 526/216; 526/224; 526/328; 526/342
[58] Field of Search .............. 260/879, 880; 526/224

[56] References Cited
U.S. PATENT DOCUMENTS

| | | | |
|---|---|---|---|
| 3,118,854 | 2/1959 | Hess, Jr. et al. | 526/224 |
| 3,226,371 | 12/1965 | Garvey et al. | 526/224 |
| 3,296,228 | 1/1967 | Squire | 526/224 |
| 3,338,862 | 8/1967 | Baker | 526/224 |
| 3,819,762 | 6/1974 | Howe | 260/879 |
| 3,828,013 | 8/1974 | Nield | 526/224 |
| 3,843,584 | 10/1974 | Turck | 526/224 |
| 3,928,498 | 12/1975 | Uraneck et al. | 526/224 |
| 3,963,807 | 6/1976 | Howe | 260/880 R |
| 3,970,623 | 7/1976 | Feeney et al. | 526/224 |

*Primary Examiner*—Herbert J. Lilling
*Attorney, Agent, or Firm*—John F. Jones; Larry W. Evans

[57] ABSTRACT

Molecular weight control is achieved in the production of acrylonitrile copolymers by means of an acid-activated mercaptan chain transfer agent.

9 Claims, No Drawings

MERCAPTAN ACTIVATION BY ACID IN THE COPOLYMERIZATION OF ACRYLONITRILE

This invention relates to a process for the acid activation of the mercaptan used as a molecular weight control agent in the copolymerization of acrylonitrile with other monomers, and more particularly pertains to the process for producing high nitrile copolymers of suitable molecular weight in high conversion at satisfactory polymerization rates using an acid-activated mercaptan chain transfer system.

Prior to our invention, the effect of acid activation of certain mercaptans used as molecular weight modifiers in the copolymerization of nitrile monomers, such as acrylonitrile, wherein a major proportion of nitrile was used was not known. Certain mercaptans which heretofore have been considered to cause sluggish copolymerization with low conversions can now be employed to give good rates of polymerization and high yields of the desired nitrile polymer by the process of this invention.

The polymers useful in the process of this invention are those which result from the polymerization of a major proportion of an olefinically unsaturated nitrile, another monomer component copolymerizable therewith and optionally a preformed rubber component.

The polymeric compositions of the present invention can be prepared by any of the known general techniques of polymerization including the bulk polymerization, solution polymerization and emulsion or suspension polymerization techniques, by batch, continuous or intermittent addition of the monomers and other components. The preferred method is emulsion or suspension polymerization in an aqueous medium. The polymerization is preferably carried out in an aqueous medium in the presence of an emulsifier or a suspending agent and a free radical generating polymerization initiator at a temperature of from about 0° to 100° C in the substantial absence of molecular oxygen.

Polymers useful in the process of this invention include those produced by polymerizing a major proportion of a monounsaturated nitrile, such as acrylonitrile, and a minor proportion of another monovinyl monomer copolymerizable with said nitrile in aqueous emulsion, optionally in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3, and the like. Most preferred for the purpose of this invention are butadiene-1,3 and isoprene because of their ready availability and their excellent polymerization tendencies.

The olefinically unsaturated nitriles useful in the present invention are the alpha,beta-olefinically unsaturated mononitriles having the structure

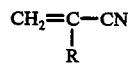

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles and conjugated dienes includes one or more of the esters of olefinically unsaturated carboxylic acids, vinyl esters, vinyl ethers, alpha-olefins, vinyl aromatic monomers, and the like.

The esters of olefinically unsaturated carboxylic acids include those having the structure

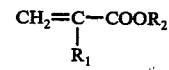

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alphachloroacrylate, ethyl alpha-chloroacrylate, and the like. Most preferred in this invention are methyl acrylate, ethyl acrylate, methyl methacrylate, and ethyl methacrylate.

The alpha-olefins useful in this invention are those having at least 4 and as many as 10 carbon atoms having the structure

wherein R′ and R″ are alkyl groups having from 1 to 7 carbon atoms and more specifically isobutylene, 2-methyl butene-1, 2-methyl pentene-1, 2-methyl hexene-1, 2-methyl heptene-1, 2-methyl octene-1, 2-ethyl butene-1, 2-propyl butene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, and the like. Most preferred is styrene.

Specific polymers useful in this invention are those prepared by the polymerization of 100 parts by weight of (A) from 60 to 90% by weight of at least one nitrile having the structure

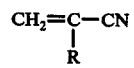

wherein R has the foregoing designation and (B) from 10 to 40% by weight based on the combined weight of (A) and (B) of at least one member selected from the group consisting of (1) an ester having the structure

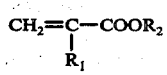

wherein $R_1$ and $R_2$ have the foregoing respective designations, (2) an alpha-olefin having the structure

where R' and R" have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure

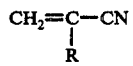

wherein R has the foregoing designation, and an ester having the structure

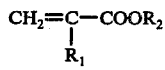

wherein $R_1$ and $R_2$ have the foregoing respective designations, said rubbery polymer containing from 50 to 100% by weight of polymerized conjugated diene and from 0 to 50% by weight of comonomer.

In the polymerization process of this invention, a polymer chain modifier and an acid are included. The polymer chain modifier preferably is added to the polymerization reaction only after from about 1 to 10% by weight of the monomers has been converted to polymer as more fully described in U.S. Pat. No. 3,891,722.

For the purpose of this invention, the terms "chain transfer agent", "polymer molecular weight modifier", "polymer chain modifier", and "regulator" are used interchangeably. A true chain transfer agent is one which when included in the free radical polymerization reaction lowers the molecular weight of the polymer formed. Most commonly used chain transfer agents are mercaptans. Chain transfer agents useful in the present invention include the primary, secondary, and tertiary alkyl mercaptans containing from 4 to 16 carbon atoms, such as n-dodecyl mercaptan, t-dodecyl mercaptan, n-dodecyl thiolacetate, the tetra mercapto ester of pentaerythritol and beta-mercapto propionic acid, limonene dimercaptan, and others more fully disclosed in U.S. Pat. No. 3,891,722. The polymer modified should be used in from 0.01 to 3% by weight based on the weight of the monomers to be polymerized.

For the purpose of this invention, the preferred polymer modifiers are the organic mercapto compounds containing more than one mercapto group per molecule such as limonene dimercaptan, and the tetra ester of pentaerythritol and beta-mercapto propionic acid. The use of the polymercapto polymer modifiers is particularly preferred because the resulting resin is substantially odorless, whereas resin prepared using lower molecular weight monomercaptans often retains an unpleasant mercaptan odor and taste. It is essential that resin used for the packaging of foods and beverages be essentially free of residual odor or taste.

Acids useful in this invention include both inorganic and organic acids. Useful inorganic acids include phosphoric, sulfuric, hydrohalides such as hydrochloric, hydrobromic; nitric, and the like; useful organic acids include the carboxylic acids such as acetic, propionic, citric, 3-mercapto propionic acid, and the like; ascorbic acid, phosphoric acid esters which contain at least one acidic hydrogen, and the like. Most preferred for the purposes of this invention are acetic, citric, phosphoric, 3-mercapto propionic and phosphoric ester acids. Phosphoric acid and its ester derivatives and salts are particularly useful in that they help prevent adhesion of polymer as it forms to the interior of the polymerization reactor and reactor components.

It is essential in the process of this invention that the polymerization be carried out at a pH no greater than about 6.5.

This invention is further illustrated in the following examples wherein the amounts of the various ingredients are given in parts by weight unless otherwise specified.

EXAMPLE 1

A. A resin which is outside the scope of the present invention useful for comparison purposes was prepared in the following manner.

A mixture of 0.85 part per hundred parts of monomer (phm) of sodium dioctyl sulfosuccinate (70% active) and 0.30 phm of polyvinyl pyrrolidone in 205 phm of water was placed in a stainless-steel polymerization reactor. To this mixture was added a latex of a butadiene:acrylonitrile (70:30) elastomer having 9 phm of elastomer in it to give a total water content in the mixture of 230 phm. To this were added 75 phm of acrylonitrile and 25 phm of methyl acrylate. The resulting mixture (pH 6.8) was stirred in a nitrogen atmosphere and the temperature of the mixture was brought to 54° C. At this point, 0.06 phm of potassium persulfate was added to the mixture. At the same time, the addition of 1.2 phm of pentaerythritol tetra-3-mercapto propionate was started and was continued over about the first 80 minutes of the polymerization reaction. The total polymerization time was about 3.5 hours. The reaction mixture was then cooled and the conversion was found to be 75% by total solids analysis. A portion of the resulting latex was coagulated in warm water (72°–74° C) containing alum. The coagulated resin was washed with water and was dried in a vacuum oven. The molecular weight of the resin was found to be 335,784 (weight average). The Brabender plasticorder torque (230° C, 35 rpm) in 10 minutes was 5000 meter grams. B. A resin was prepared which is within the scope of this invention in the following manner.

Example 1A was repeated except that 0.067 phm of phosphoric acid was added to the mixture before the addition of the acrylonitrile and methyl acrylate monomers. The pH of the starting polymerization mixture was 3.2. The conversion in this case was 92% of theory and the resulting resin was found to have a molecular weight of 126,885 and a Brabender torque at 230° C, 35 rpm, and after 10 minutes of 2120 meter grams. Thus, this resin was of a molecular weight which enables it to be readily processed in machinery commonly used for processing thermoplastic materials, whereas the resin described in A above was too high in molecular weight to be readily processed. C. The procedure of B of this example was repeated except that 0.1 phm of phosphoric acid was used in place of the 0.067 phm of phosphoric acid. The polymerization mixture pH was less than 3. Conversion was 89% of theory and the resulting resin was found to have a molecular weight of 120,967 and a Brabender torque at 230° C, 35 rpm, and after 10 minutes of 1440 meter grams. The small amount of prefloc which formed in B and C of this example was soft and friable and was easily cleaned from the stainless-steel interior of the reactor whereas the prefloc which formed in A of this example was hard, tough, and adhered tenaciously to the stainless-steel interior of the reactor.

EXAMPLE 2

The procedure of Example 1A was followed using a mixture of 0.85 phm of dioctyl sodium sulfosuccinate, 0.3 phm of polyvinyl pyrrolidone, 0.05 phm of ethylene diamine tetra acetic acid, 0.1 phm of phosphoric acid and 230 phm of water which was stirred in a stainless-steel polymerization reactor under nitrogen and the temperature of the mixture was brought to 40° C. Elastomer, potassium persulfate and monomer were added as described in Example 1 (pH 3) and the polymerization temperature was brought to 54° C. The pentaerythritol tetra-3-mercapto propionate (1.2 phm) was added to the mixture over the first 30 minutes. After 3.25 hours of polymerization, the mixture was raised to 57° C and the total polymerization time was extended to 6.5 hours. The conversion was 79% of theory and the isolated resin had a molecular weight of 126,675 and a Brabender torque of 1460 meter grams. The small amount of prefloc was soft and crumbly and did not adhere with any tenacity to the inner walls of the reactor not to the stirrer.

EXAMPLE 3

A. A mixture of 0.85 phm of dioctyl sodium sulfosuccinate, 0.3 phm of polyvinyl pyrrolidone, 204 phm of water, 0.08 phm of ascorbic acid and 0.07 phm of sodium dihydrogen phosphate monohydrate was placed in a stainless-steel polymerization reactor. This mixture was stirred and heated under a nitrogen atmosphere until the temperature of 40° C was reached. At this point, 10.3 phm (solids basis) of a latex of a 70:30 butadiene:acrylonitrile elastomer were added giving a total water content to the mixture of 230 phm. The monomers and initiator (0.06 phm of potassium persulfate) were then added as in Example 1A. The mixture (pH 5.7) was brought to the polymerization temperature of 54° C and 1.3 phm of the chain transfer agent, pentaerythritol tetra-3-mercapto propionate, were added to the polymerization mixture continuously during the first 30 minutes of the reaction. The total polymerization reaction time was 3.5 hours. Only about 0.25% by weight of prefloc was found in the reactor after the latex had been removed and this solid material was soft, friable and easily cleaned from the stainless-steel reactor interior. The conversion was found to be 77% of theory. The resin which resulted was found to have a molecular weight of 126,176 and a Brabender torque of 1290 meter grams after 15 minutes at 230° C and 35 rpm in the Brabender plasticorder.

B. Procedure A of this example was repeated except that the 0.08 phm of ascorbic acid was not included (pH 6.6). Conversion was 84% of theory and the resin which resulted was found to have a molecular weight of 193,336 and a Brabender torque at 15 minutes, 230° C, 35 rpm, of 2860 meter grams. This resin is outside the scope of this invention because it was not made with acid activation and has a molecular weight and Brabender torque too high for good processability.

EXAMPLE 4

A. Gafac RE-610 emulsifier is a mixture of phosphate esters based on nonyl phenoxy poly(ethyleneoxy) ethanols which are acidic because they are substituted phosphoric acids. In 205 phm of water, 1.25 phm of Gafac RE-610 were dissolved. To this mixture were added 9 phm (rubber solids basis) of a latex of a 70:30 butadiene:acrylonitrile elastomer containing enough water to bring the total water in the mixture to 230 phm. The pH of this mixture was adjusted to 3.7 with dilute aqueous potassium hydroxide solution and the resulting mixture was placed in a stainless-steel polymerization reactor. The monomers (75 phm of acrylonitrile and 25 phm of methyl acrylate) were added to the reactor and the reaction mixture was heated and stirred under nitrogen up to the initiation temperature of 57° C. After initiation of the polymerization reaction with the addition of 0.06 phm of potassium persulfate, 1.6 phm of pentaerythritol tetra-3-mercapto propionate were added to the reaction mixture continuously over approximately 75 minutes. After a total reaction time of 4 hours, the resulting latex was cooled and removed from the reactor. A conversion of 85% was obtained and the resin was found to have a molecular weight of 104,030 and a Brabender torque of 870 meter grams.

B. The procedure of A of this example was repeated except that the Gafac RE-610 emulsifier-water-elastomer mixture was adjusted to a pH of 4.2 with dilute potassium hydroxide solution. A conversion of 80% of theory was obtained and the resin was found to have a Brabender torque of 1540 meter grams.

C. The procedure of A of this example was repeated except that the Gafac RE-610 emulsifier-water-elastomer mixture was adjusted to a pH of 4.5 with dilute potassium hydroxide solution. A conversion of 85% of theory was obtained and the resin was found to have a molecular weight of 164,894 and a Brabender torque at 230° C and 35 rpm after 15 minutes of 2280 meter grams. Thus, it can be seen that by only varying the pH of the polymerization mixture from 3.7 to 4.5, the molecular weight was increased from 104,030 to 164,894 and the Brabender torque was increased from 870 meter grams to 2280 meter grams.

D. The procedure of Example 4A was repeated except that the pH of the Gafac-water-elastomer mixture was adjusted to 3.7 with dilute aqueous potassium hydroxide solution and no pentaerythritol tetra-3-mercapto propionate was used. In this experiment, which is outside the scope of the present invention, it was necessary to add a small amount (0.1 phm) of sodium metabisulfite and to use a total of 0.09 phm of potassium persulfate in order to achieve a conversion of 90.5%. The isolated resin was found to have a Brabender torque of 3470 meter grams at 230° C, 35 rpm and 15 minutes. The resin was observed not to be completely fused in the Brabender and it was found to have a molecular weight of 293,480.

E. The procedure of D above was repeated except that a pH of 4.5 was used. The conversion was 92% and the resin would not fuse in the Brabender at 230° C and 35 rpm. The molecular weight of the resin was found to be 371,092. It is apparent from D and E above that both mercaptan and low pH are required for proper molecular weight control of the high nitrile resins.

EXAMPLE 5

This example illustrates that another acid, citric acid, can be used along with mercaptan to achieve molecular weight control in resins prepared therewith.

A. A mixture of 0.85 phm of dioctyl sodium sulfosuccinate, 0.5 phm of polyvinyl pyrrolidone, 210 phm of water, 9 phm (solids basis) of 70:30 butadiene: acrylonitrile rubber latex with enough water to bring total water to 240 phm, and 0.035 phm of citric acid monohydrate was placed in a stainless-steel polymerization reactor. To this were added 75 phm of acrylonitrile and 25 phm of methyl acrylate. Additional 0.04 phm of citric acid monohydrate was then added and the mixture (pH 4.2) was stirred and heated to 57° C under a nitrogen atmosphere. 0.04 phm of potassium persulfate was then added and 1.6 phm of pentaerythritol tetra-3-mercapto propionate were added continuously over a 16-minute period. The total polymerization reaction time at 57° C was 3.75 hours. Conversion was 89% of theory and the resulting resin was found to have a Brabender torque at 230° C and 35 rpm after 15 minutes of 860 meter grams.

B. In a manner similar to that described in A of this example, a polymerization was carried out using no citric acid (pH 6.8). Conversion was 82% of theory and the resin was found to have a Brabender torque of 1900 meter grams.

EXAMPLE 6

This example illustrates the use of the acid, 3-mercapto propionic acid, as activator for the mercaptan in molecular weight control of a resin.

A. A mixture of 0.85 phm of dioctyl sodium sulfosuccinate, 0.3 phm of polyvinyl pyrrolidone, 9 phm (solids basis) of 70:30 butadiene-acrylonitrile rubber, and 240 phm of water was placed in a stainless-steel reactor, and 75 phm of acrylonitrile and 25 phm of methyl acrylate were added. The mixture was stirred and heated to 57° C under nitrogen and the polymerization was then initiated with the addition of 0.06 phm of potassium persulfate. After a 20-minute reaction time, 1.6 phm of a mixture of 3-mercapto propionic acid and pentaerythritol tetra-3-mercapto propionate having an acid number of 4.05 were added to the polymerization mixture continuously over a 40-minute period (pH 4.8). The total reaction time was 5 hours giving a conversion of 78% of theory. The resulting resin was found to have a Brabender torque of 1670 meter grams at 230° C, 35 rpm and 15 minutes.

B. The procedure of A of this example was repeated except that the 3-mercapto propionic acid-mercaptan mixture had an acid number of 21.9 (pH of the polymerization mixture was 3.8). The conversion was 79% of theory and the resin was found to have a Brabender torque of 840 meter grams at 230° C, 35 rpm and 15 minutes.

EXAMPLE 7

This example illustrates the use of acetic acid as activator for mercaptan in the molecular weight control of resins.

The procedure of Example 6A was repeated except that acetic acid was used in place of 3-mercapto propionic acid and there was used a mixture of 0.00858 phm of acetic acid and 1.6 phm of pentaerythritol tetra-3-mercapto propionate. The pH of the polymerization mixture was 5.8. Conversion was 84% of theory and the resin was found to have a Brabender torque at 230° C, 35 rpm, and 15 minutes of 1240 meter grams.

EXAMPLE 8

A. A mixture of 200 phm of water, 1.0 phm of sodium dioctyl sulfosuccinate and 0.5 phm of lecithin (50% acitve) was placed in a polymerization reactor. To this mixture were added 75 phm of acrylonitrile, 25 phm of methyl acrylate and 1.0 phm of pentaerythritol tetra-3-mercapto propionate. The mixture (pH 6.8) was thoroughly purged with nitrogen and 0.1 phm of potassium persulfate was then added. The polymerization was carried out for 15.5 hours at 60° C with agitation. A conversion of 95% was obtained. The resin was found to have a Brabender torque at 230° C, 35 rpm, and 15 minutes of 3000 meter grams. This resin was too high in molecular weight for good processability and was outside the scope of this invention.

B. A of this example was repeated except that 0.0379 phm of 3-mercapto propionic acid was included in the polymerization recipe (pH 4.5). The conversion was 93% of theory and the resin was found to have a Brabender torque of 2080 meter grams at 230° C, 35 rpm, and after 15 minutes.

EXAMPLE 9

A. A mixture of 250 phm of water and 2 phm of Gafac RE-610 emulsifier was added to a stainless-steel polymerization reactor. The pH of the mixture was 3.1. To this mixture were added 8.24 weight percent of acrylonitrilestyrene monomer mixture (weight ratio of 9.6:0.4) and 10% by weight of limonene dimercaptan (total 0.1 phm). The mixture was stirred, purged with nitrogen and heated to the reaction temperature of 70° C at which point the polymerization was initiated with 0.1 phm of azobisisobutyronitrile. The remainder of the monomer-mercaptan mixture was added continuously linearly over a 5-hour period. This mixture was composed of 67.5 phm of acrylonitrile, 24.83 phm of styrene and 0.9 phm of limonene dimercaptan. During the monomer-mercaptan addition, the mixture was boosted with 0.025-phm increments of axobisisobutyronitrile at 1.5 and 3.0 hours after initiation occurred. At the end of the addition of the monomer-mercaptan mixture, the polymerization mixture was heated for an additional 30 minutes at 70° C. Conversion was 85% of theory. The resulting resin was found to have a molecular weight of 88,550 and a Brabender torque of 950 meter grams.

B. A repeat of A of this example was carried out except that the Gafac RE-610-water mixture was adjusted to pH 7 with dilute potassium hydroxide before any of the other ingredients were added. Conversion was 88% of theory and the resin was found to have a molecular weight of 139,500 and a Brabender torque of 2050 meter grams.

EXAMPLE 10

A. The procedure of Example 9A was repeated except that 1.0 phm of t-butyl mercaptan was substituted for the 1.0 phm of limonene dimercaptan. The pH of the Gafac RE-610-water mixture was 3.0. Conversion was 80% of theory and the resin was found to have a molecular weight of 110,000 and a Brabender torque of 1680 meter grams.

B. The procedure of A of this example was repeated except that the Gafac RE-610-water mixture was adjusted to pH 7.0 with dilute potassium hydroxide prior to the addition of other ingredients. Conversion was 83% of theory and the resin was found to have a molecular weight of 234,100 and a Brabender torque of 3560 meter grams.

EXAMPLE 11

A. The pH of a mixture of 205 phm of water and 1.25 phm of Gafac RE-610 was adjusted to 5.2 with dilute potassium hydroxide solution. To this mixture in a polymerization reactor were added 9 phm (solids basis) of a 70:30 butadiene:acrylonitrile elastomer latex to give a total water content in the mixture of 230 phm. Ninety percent by weight of a 75 phm acrylonitrile-25 phm methyl acrylate mixture was added and the remaining 10% by weight of the monomer mixture was used as solvent for the mercaptan (1.2 phm of t-butyl mercaptan) which was added over 75 minutes once the polymerization was started. The polymerization reaction was initiated at 60° C with stirring under nitrogen by the addition of 0.06 phm of potassium persulfate. The total reaction time was 3.5 hours and conversion as 95%. The resin was found to have a molecular weight of 118,000 and a Brabender torque of 1750 meter grams.

B. The procedure of A of this example was repeated except that the Gafac RE-610-water mixture was neutralized to pH 2.1 before the other ingredients were added. Conversion was 93% and the resin was found to have a molecular weight of 107,000 and a Brabender torque of 1440 meter grams.

EXAMPLE 12

A. A resin which is outside the scope of this invention was prepared by an aqueous suspension technique in which a pH of 7.0 was employed. A mixture of 0.1 phm of hydroxyethyl cellulose and 300 phm of water was placed in a polymerization reactor. To this mixture were added 75 phm of acrylonitrile, 2 phm of styrene, and 0.2 phm of pentaerythritol tetra-3-mercapto propionate. This mixture was heated under nitrogen with stirring to 60° C at which point 0.1 phm of Vazo 52 (2,2' azobis-(2,4-dimethyl valeronitrile)) initiator was added. In 15 minutes later, a mixture of 23 phm of styrene and 0.8 phm of pentaerythritol tetra-3-mercapto propionate was added continuously over a period of 3 hours. During this 3-hour period, 0.05 -phm portions of Vazo 52 initiator were added at 1.25 hours and at 2.25 hours following initiation. Following the completion of the addition of the styrene-mercaptan mixture, the polymerization mixture was stirred for an additional 15 minutes at 60° C. The mixture was cooled to room temperature and the resin was isolated by filtration and washed with water. The resin was dried at reduced pressure and 50° C for 48 hours. A 79% conversion was obtained. The Brabender torque of the dry resin was greater than 4000 meter grams at 230° C, 35 rpm after 15 minutes.

B. A of this example was repeated except that enough phosphoric acid was added to the initial polymerization mixture of water and monomers to give a pH of 5. Polymer conversion was 78%. The resin was found to have a Brabender torque of 1700 meter grams at 230° C, 35 rpm, in 15 minutes.

We claim:

1. The process comprising polymerizing in an aqueous medium with a free radical generating polymerization initiator at a temperature of from about 0 to 100° C in the substantial absence of molecular oxygen 100 parts by weight of
   (A) from 60 to 90% by weight of at least one nitrile having the structure

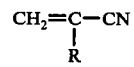

wherein R is hydrogen, a lower alkyl group having from 1 to 4 carbon atoms, or a halogen, and
   (B) from 10 to 40% by weight based on the combined weight of (A) and (B) of at least one member selected from the group consisting of
   (1) an ester having the structure

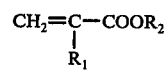

wherein $R_1$ is hydrogen, an alkyl group having from 1 to 4 carbon atoms, or a halogen, and $R_2$ is an alkyl group having from 1 to 6 carbon atoms,
   (2) an alpha-olefin having the structure

wherein R' and R'' are alkyl groups having from 1 to 7 carbon atoms,
   (3) a vinyl ether selected from the group consisting of methyl vinyl ether, ethyl vinyl ether, the propyl vinyl ethers, and the butyl vinyl ethers,
   (4) vinyl acetate, and
   (5) styrene,
   in the presence of from 0 to 40 parts by weight of
   (C) a rubbery polymer of a conjugated diene monomer selected from the group consisting of butadiene and isoprene and optionally a comonomer selected from the group consisting of styrene, a nitrile monomer having the structure

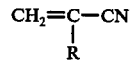

wherein R has the foregoing designation, and an ester having the structure

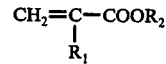

wherein $R_1$ and $R_2$ have the foregoing designations, said rubbery polymer containing from 50 to 100% by weight of polymerized conjugated diene and from 0 to 50% by weight of comonomer wherein the polymerization is carried out in the presence of from 0.01 to 3% by weight based on the combined weight of (A) and (B) of a mercaptan at a pH no greater than 6.5.

2. The process of claim 1 carried out in emulsion or suspension.

3. The process of claim 2 wherein (A) is acrylonitrile.

4. The process of claim 3 wherein (B) is methyl acrylate.

5. The process of claim 3 wherein (B) is styrene.

6. The process of claim 4 wherein (C) is a butadiene-acrylonitrile rubber.

7. The process of claim 5 wherein (C) is a butadiene-styrene rubber.

8. The process of claim 3 wherein the mercaptan is a member selected from the group consisting of primary, secondary and tertiary alkyl mercaptans containing from 4 to 16 carbon atoms, the tetra mercapto ester of pentaerythritol and beta-mercapto propionic acid, and limonene dimercaptan.

9. The process of claim 3 wherein the pH is controlled by using a member selected from the group consisting of phosphoric acid and its ester derivatives and salts, sulfuric acid, hydrochloric acid, hydrobromic acid, nitric acid, acetic acid, propionic acid, citric acid, 3-mercapto propionic acid, and ascorbic acid.

* * * * *